United States Patent
Thomas et al.

(10) Patent No.: US 12,211,019 B2
(45) Date of Patent: *Jan. 28, 2025

(54) SMART CHAINING

(71) Applicant: Wells Fargo Bank, N.A., San Francisco, CA (US)

(72) Inventors: Michael R. Thomas, San Francisco, CA (US); Elizabeth Schrag, Walnut Creek, CA (US); Jimmy Wang, Alamo, CA (US); Jerome Rhodes, Hayward, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,970

(22) Filed: Jul. 17, 2023

(65) Prior Publication Data

US 2023/0360012 A1 Nov. 9, 2023

Related U.S. Application Data

(63) Continuation of application No. 17/493,520, filed on Oct. 4, 2021, now Pat. No. 11,704,639, which is a
(Continued)

(51) Int. Cl.
*G06Q 20/10* (2012.01)
*G06K 19/10* (2006.01)
(Continued)

(52) U.S. Cl.
CPC ......... *G06Q 20/1085* (2013.01); *G06K 19/10* (2013.01); *G07F 19/201* (2013.01);
(Continued)

(58) Field of Classification Search
CPC .... G06K 19/10; G06Q 20/1085; G06Q 20/34; G07F 19/201; G07F 19/202; G07F 19/206

See application file for complete search history.

(56) References Cited

U.S. PATENT DOCUMENTS 4,839,504 A 6/1989 Nakano
5,010,238 A 4/1991 Kadono et al.
(Continued)

FOREIGN PATENT DOCUMENTS

JP 2007-316960 A 12/2007

OTHER PUBLICATIONS

Morrison, D., Gift Cards via ATMs, Credit Union Times Magazine & CUI Breaking News, Dec. 12, 2012, 2 pages.
(Continued)

*Primary Examiner* — Thien M Le
(74) *Attorney, Agent, or Firm* — Foley & Lardner LLP (57) ABSTRACT

Identification information is received at a transaction machine. The identification information is associated with a user associated with an account. Using an activity profile of the user, a determination is made to enable chained transactions during the user's use of the transaction machine. A sequence of user interfaces to display to the user is generated enabling the user to chain transactions based on the activity profile.

20 Claims, 5 Drawing Sheets

Related U.S. Application Data continuation of application No. 16/818,912, filed on Mar. 13, 2020, now Pat. No. 11,138,579, which is a continuation of application No. 16/138,740, filed on Sep. 21, 2018, now Pat. No. 10,592,878, which is a continuation of application No. 15/395,096, filed on Dec. 30, 2016, now Pat. No. 10,282,716, which is a continuation of application No. 14/819,124, filed on Aug. 5, 2015, now Pat. No. 9,589,256, which is a continuation-in-part of application No. 14/549,151, filed on Nov. 20, 2014, now Pat. No. 9,292,840, which is a continuation-in-part of application No. 14/076,071, filed on Nov. 8, 2013, now Pat. No. 9,230,413, which is a continuation of application No. 13/441,777, filed on Apr. 6, 2012, now Pat. No. 8,602,296.

(60) Provisional application No. 62/034,455, filed on Aug. 7, 2014, provisional application No. 61/473,053, filed on Apr. 7, 2011.

(51) Int. Cl.
  *G07F 19/00* (2006.01)
  *G06Q 20/34* (2012.01)

(52) U.S. Cl.
  CPC .......... *G07F 19/202* (2013.01); *G07F 19/206* (2013.01); *G06Q 20/34* (2013.01)

(56) References Cited

U.S. PATENT DOCUMENTS

| | | |
|---|---|---|
| 5,326,734 A | 7/1994 | Vaughan |
| 5,796,827 A | 8/1998 | Coppersmith et al. |
| 5,880,444 A | 3/1999 | Shibata et al. |
| 6,067,621 A | 5/2000 | Yu et al. |
| 6,567,842 B2 | 5/2003 | De Leo et al. |
| 7,100,199 B2 | 8/2006 | Ginter et al. |
| 7,266,533 B2 | 9/2007 | Karas et al. |
| 7,416,112 B2 | 8/2008 | Smith et al. |
| 7,419,091 B1 | 9/2008 | Scanlon |
| 7,801,775 B1 | 9/2010 | Roseman et al. |
| 7,822,635 B1 | 10/2010 | Brown et al. |
| 7,864,753 B1 | 1/2011 | Barzegar et al. |
| 7,886,971 B2 | 2/2011 | Cassady et al. |
| 8,020,754 B2 | 9/2011 | Schwarz, Jr. |
| 8,073,712 B2 | 12/2011 | Jacobus et al. |
| 8,156,042 B2 | 4/2012 | Winkelman, III et al. |
| 8,220,943 B2 | 7/2012 | Koma et al. |
| 8,255,318 B2 | 8/2012 | Royyuru |
| 8,396,794 B1 | 3/2013 | Mo et al. |
| 8,474,699 B2 | 7/2013 | Kolinski-Schultz et al. |
| 8,554,671 B2 | 10/2013 | Ballout |
| 8,561,891 B2 | 10/2013 | Dent et al. |
| 8,602,296 B1 | 12/2013 | Velline et al. |
| 8,630,402 B1 | 1/2014 | Martinez et al. |
| 8,635,158 B1 | 1/2014 | Ledder et al. |
| 8,655,762 B2 | 2/2014 | Abifaker |
| 8,690,051 B1 | 4/2014 | Velline et al. |
| 8,731,997 B2 | 5/2014 | Corbett et al. |
| 8,767,151 B2 | 7/2014 | Chang et al. |
| 8,797,297 B2 | 8/2014 | Yabuta et al. |
| 8,821,262 B2 | 9/2014 | Smith et al. |
| 9,230,413 B1 | 1/2016 | Velline et al. |
| 9,268,390 B2 | 2/2016 | Gear et al. |
| 9,286,637 B1 | 3/2016 | Keld et al. |
| 9,292,840 B1 | 3/2016 | Velline et al. |
| 9,589,256 B1 | 3/2017 | Thomas et al. |
| 9,754,461 B1 | 9/2017 | Velline et al. |
| 10,282,716 B1 | 5/2019 | Thomas et al. |
| 10,522,007 B1 | 12/2019 | Velline et al. |
| 10,592,878 B1 | 3/2020 | Thomas et al. |
| 10,810,660 B1 | 10/2020 | Diggdon et al. |
| 11,017,396 B2* | 5/2021 | Ishikawa .................... H04L 9/50 |
| 11,341,504 B1* | 5/2022 | Stanev ................. G06Q 20/405 |
| 2002/0073050 A1 | 6/2002 | Gusler et al. |
| 2002/0133409 A1 | 9/2002 | Sawano et al. |
| 2002/0138418 A1 | 9/2002 | Zarin et al. |
| 2003/0004934 A1 | 1/2003 | Qian |
| 2003/0040959 A1* | 2/2003 | Fei .......................... G06Q 20/10 |
| | | 705/39 |
| 2003/0041244 A1 | 2/2003 | Buttyan et al. |
| 2003/0061170 A1 | 3/2003 | Uzo |
| 2003/0066876 A1 | 4/2003 | Goldman et al. |
| 2003/0080852 A1 | 5/2003 | Harris |
| 2003/0093293 A1 | 5/2003 | Han |
| 2003/0097333 A1 | 5/2003 | Okamura |
| 2003/0168510 A1* | 9/2003 | Allen .................... G06Q 20/342 |
| | | 235/380 |
| 2004/0004116 A1 | 1/2004 | Hatanaka et al. |
| 2004/0030894 A1 | 2/2004 | Labrou et al. |
| 2004/0215566 A1 | 10/2004 | Meurer |
| 2005/0027543 A1 | 2/2005 | Labrou et al. |
| 2005/0080727 A1 | 4/2005 | Postrel |
| 2005/0161502 A1 | 7/2005 | Smith et al. |
| 2005/0216744 A1 | 9/2005 | Skygebjer |
| 2005/0234769 A1 | 10/2005 | Jain et al. |
| 2005/0269402 A1 | 12/2005 | Spitzer et al. |
| 2005/0278222 A1 | 12/2005 | Nortrup |
| 2006/0020542 A1 | 1/2006 | Litle et al. |
| 2006/0038004 A1 | 2/2006 | Rielly et al. |
| 2006/0107037 A1 | 5/2006 | Lincoln |
| 2006/0157553 A1 | 7/2006 | Kelley et al. |
| 2006/0168657 A1 | 7/2006 | Baentsch et al. |
| 2006/0178856 A1 | 8/2006 | Roberts et al. |
| 2006/0178932 A1 | 8/2006 | Lang |
| 2006/0179304 A1 | 8/2006 | Han |
| 2006/0249568 A1 | 11/2006 | Scanlon |
| 2006/0287965 A1 | 12/2006 | Bajan |
| 2006/0289630 A1 | 12/2006 | Updike et al. |
| 2006/0294023 A1 | 12/2006 | Lu |
| 2007/0030824 A1 | 2/2007 | Ribaudo et al. |
| 2007/0037554 A1 | 2/2007 | Freeny, Jr. |
| 2007/0162554 A1 | 7/2007 | Branda et al. |
| 2007/0255653 A1 | 11/2007 | Tumminaro et al. |
| 2007/0265948 A1 | 11/2007 | Maiorino et al. |
| 2008/0052686 A1 | 2/2008 | Jogand-Coulomb et al. |
| 2008/0074496 A1* | 3/2008 | Venetianer ................ G06T 7/20 |
| | | 348/150 |
| 2008/0076534 A1 | 3/2008 | Iddings et al. |
| 2008/0086693 A1 | 4/2008 | Jogand-Coulomb et al. |
| 2008/0320139 A1 | 12/2008 | Fukuda et al. |
| 2009/0037995 A1 | 2/2009 | Zapata et al. |
| 2009/0063345 A1 | 3/2009 | Erikson |
| 2009/0064284 A1 | 3/2009 | Poston et al. |
| 2009/0076934 A1 | 3/2009 | Shahbazi et al. |
| 2009/0102989 A1 | 4/2009 | Sakai et al. |
| 2009/0106158 A1 | 4/2009 | Hill |
| 2009/0108015 A1 | 4/2009 | Kreamer |
| 2009/0124384 A1 | 5/2009 | Smith et al. |
| 2009/0132819 A1* | 5/2009 | Lu .......................... G06Q 20/10 |
| | | 713/169 |
| 2009/0156190 A1 | 6/2009 | Fisher |
| 2009/0186690 A1 | 7/2009 | Toth et al. |
| 2009/0276284 A1 | 11/2009 | Yost |
| 2009/0320106 A1 | 12/2009 | Jones et al. |
| 2010/0030687 A1 | 2/2010 | Panthaki et al. |
| 2010/0113950 A1 | 5/2010 | Lin et al. |
| 2010/0145854 A1 | 6/2010 | Messerges et al. |
| 2010/0228580 A1* | 9/2010 | Zoldi ...................... G06Q 40/12 |
| | | 707/E17.014 |
| 2010/0235283 A1 | 9/2010 | Gerson |
| 2010/0332388 A1 | 12/2010 | Rielly et al. |
| 2011/0106597 A1 | 5/2011 | Ferdman et al. |
| 2011/0137689 A1 | 6/2011 | Chua et al. |
| 2011/0140841 A1 | 6/2011 | Bona et al. |
| 2011/0159850 A1 | 6/2011 | Faith et al. |
| 2011/0162078 A1 | 6/2011 | Taveau et al. |
| 2012/0012652 A1 | 1/2012 | Couper et al. |
| 2012/0016794 A1 | 1/2012 | Orr et al. |
| 2012/0018007 A1 | 1/2012 | Villermaux et al. |
| 2012/0023019 A1 | 1/2012 | Hartfield et al. |

(56) References Cited

U.S. PATENT DOCUMENTS

| | | |
|---|---|---|
| 2012/0035906 A1 | 2/2012 | Jephcott |
| 2012/0066127 A1 | 3/2012 | Kingston et al. |
| 2012/0101881 A1 | 4/2012 | Taylor et al. |
| 2012/0150611 A1 | 6/2012 | Isaacson et al. |
| 2012/0159294 A1 | 6/2012 | Gonsalves et al. |
| 2012/0179602 A1* | 7/2012 | Wheelock ............ G06Q 20/10 235/380 |
| 2012/0185322 A1 | 7/2012 | Shipley |
| 2012/0185388 A1 | 7/2012 | Pranger |
| 2012/0245987 A1 | 9/2012 | Isaacson et al. |
| 2012/0278234 A1 | 11/2012 | Dent et al. |
| 2012/0292388 A1 | 11/2012 | Hernandez |
| 2013/0013268 A1 | 1/2013 | Woolf et al. |
| 2013/0024239 A1 | 1/2013 | Baker et al. |
| 2013/0046810 A1 | 2/2013 | Loew |
| 2013/0073388 A1 | 3/2013 | Heath |
| 2013/0151617 A1 | 6/2013 | Davis et al. |
| 2013/0173389 A1 | 7/2013 | Page et al. |
| 2013/0211890 A1 | 8/2013 | Heitmueller et al. |
| 2013/0310163 A1 | 11/2013 | Smith et al. |
| 2013/0325671 A1 | 12/2013 | Glass et al. |
| 2014/0006129 A1 | 1/2014 | Heath |
| 2014/0032372 A1 | 1/2014 | King et al. |
| 2014/0074632 A1* | 3/2014 | Mateen ............ G06Q 20/4037 705/16 |
| 2014/0089188 A1 | 3/2014 | Rao |
| 2014/0129440 A1 | 5/2014 | Smith et al. |
| 2014/0149195 A1 | 5/2014 | Abbott et al. |
| 2014/0164762 A1 | 6/2014 | Lee et al. |
| 2014/0207612 A1 | 7/2014 | Isaacson et al. |
| 2014/0229270 A1 | 8/2014 | Rashwan |
| 2014/0229387 A1 | 8/2014 | Chow |
| 2014/0245392 A1 | 8/2014 | Masters et al. |
| 2014/0279527 A1 | 9/2014 | Duke et al. |
| 2014/0280634 A1 | 9/2014 | Mansfield et al. |
| 2014/0316917 A1 | 10/2014 | Westby et al. |
| 2015/0006426 A1 | 1/2015 | Sobhani et al. |
| 2015/0025950 A1 | 1/2015 | Yu |
| 2015/0066748 A1 | 3/2015 | Winslow et al. |
| 2015/0088650 A1 | 3/2015 | Taylor et al. |
| 2015/0127478 A1 | 5/2015 | Westby et al. |
| 2015/0136850 A1 | 5/2015 | Akahane |
| 2015/0186857 A1 | 7/2015 | Swinfen |
| 2015/0356639 A1 | 12/2015 | Sobhani |
| 2016/0012411 A1 | 1/2016 | Kursun et al. |
| 2016/0012431 A1 | 1/2016 | Proctor et al. |
| 2016/0035026 A1 | 2/2016 | Chen |
| 2016/0042334 A1 | 2/2016 | Westby et al. |
| 2016/0078527 A1* | 3/2016 | Dupuis ............ G06Q 40/02 705/42 |
| 2016/0098709 A1 | 4/2016 | Johnson et al. |
| 2016/0358162 A1 | 12/2016 | Park et al. |

OTHER PUBLICATIONS

Morrison, D., Gift Cards via ATMs, Credit Union Times Magazine & CUTBreakingNews, Dec. 12, 2012, 2 pages.

Talbot, M., Commentary: Banking and social media: Where is it going?, ATM Marketplace, Aug. 30, 2012, retrieved from the Internet at http://www.atmmarketplace.com/articles/commentary-banking-and-social-media-where-is-it-going-2/ on Dec. 12, 2016, 2 pages as printed.

Whatcom Educational Credit Union,"WECU Visa News: Tips for Shopping, Card Safety, and Fraud Protection" brochure, Nov. 2006, 1 page.

* cited by examiner

SMART CHAINING

CROSS-REFERENCE TO RELATED PATENT APPLICATIONS

This application is a continuation of U.S. patent application Ser. No. 17/493,520 filed Oct. 4, 2021, which is a continuation of U.S. patent application Ser. No. 16/818,912 filed Mar. 13, 2020 (now U.S. Pat. No. 11,138,579), which is a continuation of U.S. patent application Ser. No. 16/138,740 filed Sep. 21, 2018 (now U.S. Pat. No. 10,592,878), which is a continuation of U.S. patent application Ser. No. 15/395,096 filed Dec. 30, 2016 (now U.S. Pat. No. 10,282,716), which is a continuation of U.S. patent application Ser. No. 14/819,124 filed Aug. 5, 2015 (now U.S. Pat. No. 9,589,256), which claims priority to U.S. Patent Application No. 62/034,455 filed Aug. 7, 2014 and is a continuation-in-part of U.S. patent application Ser. No. 14/549,151 filed Nov. 20, 2014 (now U.S. Pat. No. 9,292,840), which is a continuation-in-part of U.S. patent application Ser. No. 14/076,071 filed Nov. 8, 2013 (now U.S. Pat. No. 9,230,413), which is a continuation of U.S. patent application Ser. No. 13/441,777 filed Apr. 6, 2012 (now U.S. Pat. No. 8,602,296), which claims priority to U.S. Patent Application No. 61/473,053 filed Apr. 7, 2011, all of which are incorporated herein by reference in their entireties.

BACKGROUND

Financial institutions provide various ways for customers to access account information and perform transactions, such as transaction machines, websites, and brick and mortar locations (e.g., retail bank branches). Transaction machines, such as automated teller machines (ATMs), may be accessed at various geographic locations, such as bank locations, convenience stores or other stores to facilitate the account holder's interaction with banking systems. Transaction machines accept transaction cards such as debit, credit or stored value cards that are often used by account holders to purchase items or services or to obtain funds.

SUMMARY

A first example embodiment relates to a method. The method includes receiving identification information from a transaction card at a transaction machine, where the transaction card is associated with an account holder using the transaction machine and includes a transaction card type. The account holder is associated with an account at a financial institution. The method further includes accessing, using the identification information, activity profile information for the account holder from an account database of a financial institution computing system of the financial institution and monitoring the account holder's transaction machine usage. The method further includes storing activity profile information related to the account holder's transaction machine usage in the account database, and generating, by the transaction machine, a custom sequence of user interfaces to be displayed to the account holder based on the transaction card type.

Another example embodiment relates to an automated teller machine. The automated teller machine includes a display, a dispensing device, a deposit device, a transaction card reader, user interface generation logic, and a data storage system. The transaction card reader receives identification information from a transaction card. The transaction card is associated with an account holder using the automated teller machine and includes a transaction card type. The user interface generation logic is configured to access activity profile information for the account holder, initiate a transaction machine session, and monitor the account holder's transaction machine usage. The data storage system is configured to store activity profile information related to the account holder's transaction machine usage. The user interface generation logic is configured to generate a sequence of user interfaces. The sequence of user interfaces is based on the transaction card type.

Another example embodiments relates to a method. The method includes receiving identification information from a transaction card at a transaction machine. The transaction card is associated with an account holder using the transaction machine and includes a transaction card type. Using the identification information, activity profile information is accessed for the account holder. The account holder's transaction card is ejected and the transaction machine session is ended after a predetermined number of transactions. The predetermined number of transactions is based on the transaction card type.

DETAILED DESCRIPTION

Figure 1:
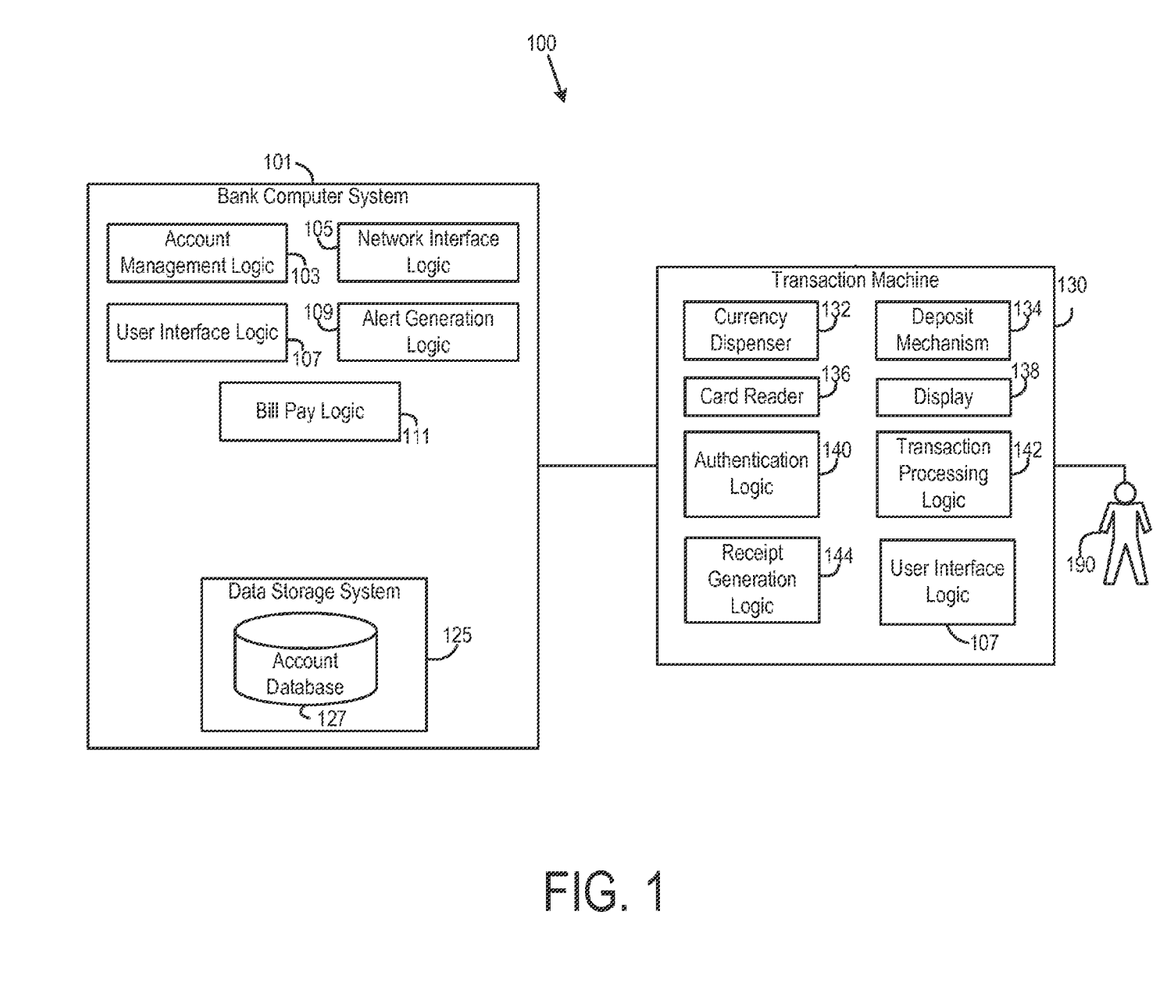
FIG. 1 is a schematic diagram of a system that includes a transaction machine that communicates with a bank computer system.

Referring to FIG. 1, a system 100 is shown according to an example embodiment. The system 100 may include a bank computer system 101 and one or more transaction machines 130, such as automated teller machines (ATMs). The system 100 may be accessed by an account holder 190 who seeks to perform a financial transaction, obtain account information, access other products/services, and so on.

In an example embodiment, the bank computer system 101 may be provided or controlled by a bank or other financial institution and the users may be the customers or account holders of the financial institution. Users may access the bank computer system 101 through the transaction machine 130. For example, as shown in FIG. 1, an account holder 190 accesses the bank computer system 101 through the transaction machine 130. In practice, the bank computer system 101 may include server computing systems, for example, comprising one or more networked computer servers having a processor and non-transitory machine readable media. The logic or logics described herein may therefore be implemented as program logic that is stored on the machine-readable media and that, when executed by the processor, causes the processor to perform the operations described.

As described in greater detail below, the bank computer system 101 and the transaction machine 130 may cooperate to provide a sequence of user interfaces at the transaction machine 130 that is customized to the user. The bank computer system 101 and the transaction machine 130 may cooperate to provide a user with the ability to chain multiple transactions during a single session (without re-authenticating). For example, upon authenticating the user at an ATM using a bank card and PIN, the user may request to purchase stamps, and upon receiving stamps from the transaction machine, the user may be prompted to make a withdrawal, deposit, donate, make a payment, print previous transactions, and so on, until the user wishes to no longer make additional transactions and end the session. In one embodiment, the bank computer system 101 and the transaction machine 130 may not offer the option to a user to chain multiple transactions during a single session. For example, upon using a bank card and PIN number to log into an ATM, a user may request to purchase stamps, and upon receiving stamps from the transaction machine, the ATM may end the user's session. The customization may be made based on the activity profile information for the customer, including information about previously performed transactions, customer personas, whether the user has previously chained transactions, whether the user has lost bank cards, preferences specified by the user, and so on. Customized sequencing of user interfaces is described in greater detail below.

The bank computer system 101 may further include, among other systems, account management logic 103, network interface logic 105, user interface logic 107, alert generation logic 109, bill pay logic 111, and data storage system 125. Account management logic 103 may perform various tasks in connection with accounts held by account holders at the financial institution, such as account processing (processing of account debits and credits), authentication, statement generation, account status, funds transfers, and so on. Account management logic 103 may also maintain a log of all transactions that occurred in the past and store data related to the account in a data storage system 125.

Network interface logic 105 may be used to connect the bank computer system 101 to communicate with other systems such as the transaction machine 130. An embodiment of the network interface logic 105 may be configured to communicate with the transaction machine 130 over a proprietary encrypted network. Another embodiment of the network interface logic 105 may be configured to communicate with the transaction machine 130 over a public encrypted network. The network interface logic 105 may also comprise logic that is configured to provide an interface for other types of devices, including mobile devices such as cell phones, smart phones, mobile slate, or tablets.

User interface logic 107 may generate customized sequences of menus and menu options. As previously indicated, the computer system 101 and the transaction machine 130 may cooperate to provide a customized sequence of user interfaces at the transaction machine 130. As indicated in FIG. 1, the user interface logic 107 may comprise program logic located at the bank computer system 101, at the transaction machine 130, or at both the bank computer system 101 and the transaction machine 130. That is, the operations described herein as being performed by the user interface logic 107 may be performed either at the bank computer system 101, at the transaction machine 130, or at both the bank computer system 101 and the transaction machine 130. The user interface logic 107 generates a graphical user interface for presentation to the account holder 190 at the transaction machine 130 via a display 138. The user interface logic 107 may receive information or adjust the sequence of user interfaces on the display 138 according to data provided by the user interface logic 107. Other configurations are also possible, some of which are described below.

Alert generation logic 109 may generate alerts for account holders. For example, the alert generation logic 109 may track information regarding the due dates of various bills and generate alerts regarding an account holder's past due bills or bills due in the near future. The alert generation logic 109 may also generate alerts regarding other account activity, e.g., alerts about possible fraudulent transactions.

Bill pay logic 111 may be configured to receive bill related information including the third party account number, due date and amount due. In various embodiments, the bill pay logic 111 may allow the account holder 190 to make the payment on a future date. In other embodiments, the bill pay logic 111 may allow the account holder 190 to choose to pay the bill on the same day.

The data storage system 125 may include an account database 127. The account database 127 can be structured according to various database types, such as, relational, hierarchical, network, flat or object relational. The account database 127 may be configured to store account balances and a log of each transaction processed by the account management logic 103. The account database 127 may be configured to store other activity profile information such as account preferences the user has specified, whether the user has previously chained transactions, whether the user has lost bank cards, and so on.

The transaction machine 130 may, for example, be an automated teller machine, a point of sale device, or other device. For example, the transaction machine 130 may include a currency dispenser 132, deposit mechanism 134, card reader 136, display 138, authentication logic 140, transaction processing logic 142, and receipt generation logic 144. Other hardware may also be included, such as a keypad, a microphone, a camera, or buttons for receiving user inputs.

The currency dispenser 132 may dispense currency notes ("cash") or other forms of currency to an account holder 190 from their financial institution accounts. The currency dispenser 132 may be configured to dispense currency in various denominations, as specified by the account holder 190. The deposit mechanism 134 may be configured to accept deposits of currency, such as envelope or envelope-free deposits of cash and/or checks.

The card reader 136 may be configured to read information from a transaction card. The transaction card may include many different types of cards, for example, a credit card, debit card, check card, ATM card, stored value card, or the like. The card reader 136 may be configured to scan information from a magnetic stripe ("magstripe") of a transaction card. Some transaction machines may require the user to "dip" or "swipe" their transaction card, while other transaction machines may require the user to insert their transaction card, in which case the user's card may be retained by the machine for the duration of the session. Alternatively, the card reader 136 may be configured to communicate with the transaction card via near field communications (NFC). While performing the read operation, the card reader 136 may be configured to read the account information and the PIN associated with the card and the account.

The display 138 may be configured to display graphics such as menus, instructions, background photos (e.g., advertisements, etc.), logos, and so on. In one embodiment, the display 138 is a touch screen display that is capable of detecting user touches, e.g., to make menu selections. The display 138 allows the account holder 190 to interact with the transaction machine 130 in order to process transactions. The transactions may include withdrawing funds, purchasing one or more goods or services, transferring funds from one account to another account, paying a bill or mortgage and so on. As will be discussed further below, the display 138 may be used to display various custom sequences of user interfaces to the account holder 190.

The authentication logic 140 may be configured to authenticate information received by the transaction machine 130 to approve or reject a transaction. The information authentication logic 140 may approve or deny authentication for transaction data received by the transaction machine 130. The authentication logic 140 authenticates a user as being a valid account holder associated with the transaction card and the corresponding account at the bank or financial institution.

The transaction processing logic 142 processes each transaction requested by the account holder 190. For example, the transaction processing logic 124 may cooperate with the account management logic 103 of the bank computer system 101 to ensure that transactions are properly debited/credit to the account held by the account holder 190. The receipt generation logic 144 generates a receipt for each transaction.

Figure 2:
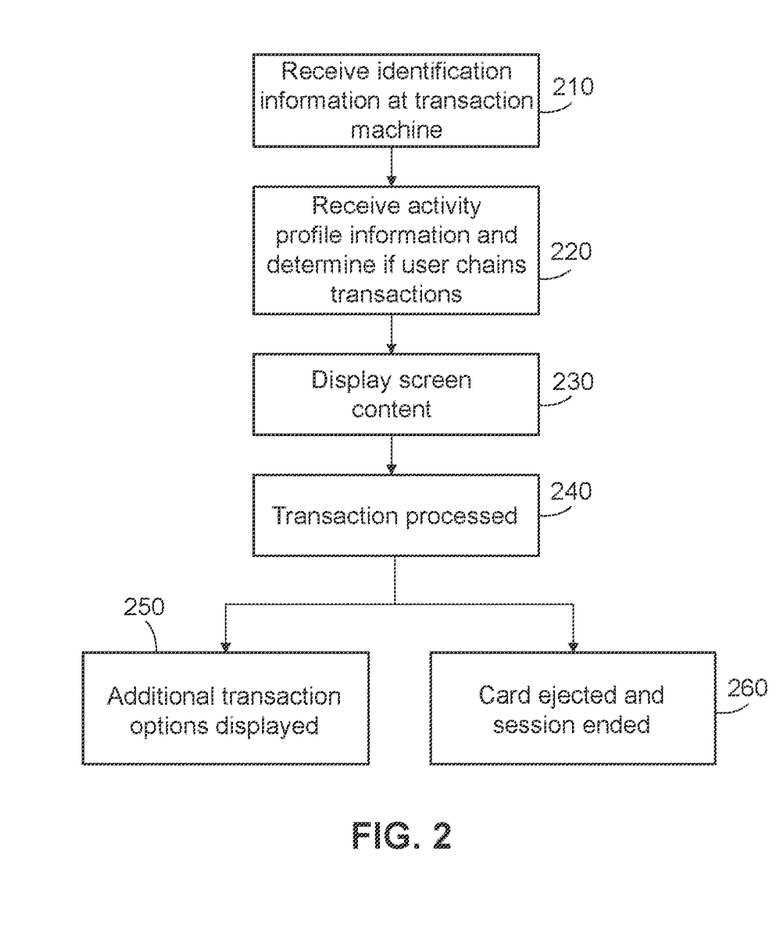
FIG. 2 shows an overall process for generating a custom sequence of user interfaces.
Figure 3:
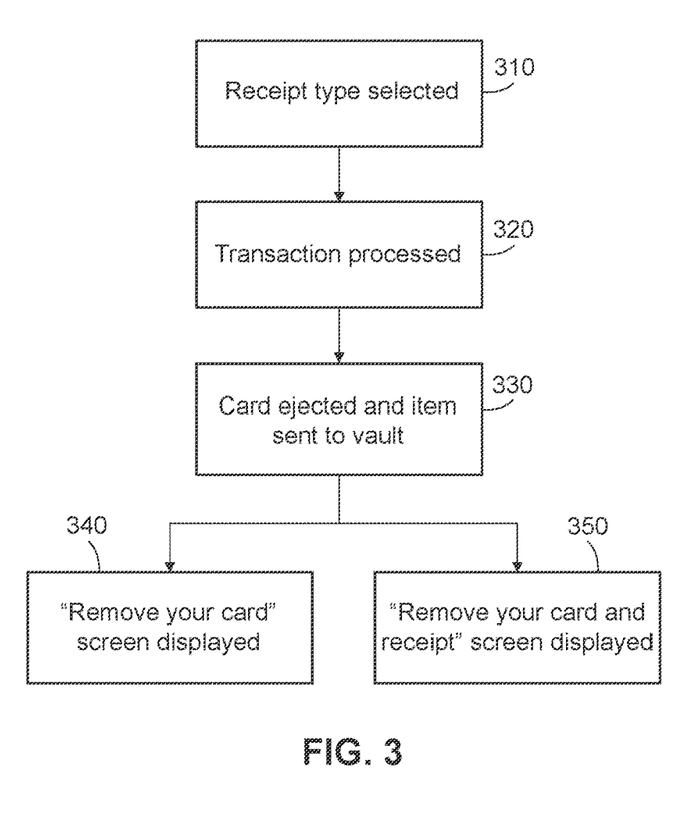
FIG. 3 shows a process for selectively returning a transaction card to a user of a transaction machine upon completion of a deposit.
Figure 4:
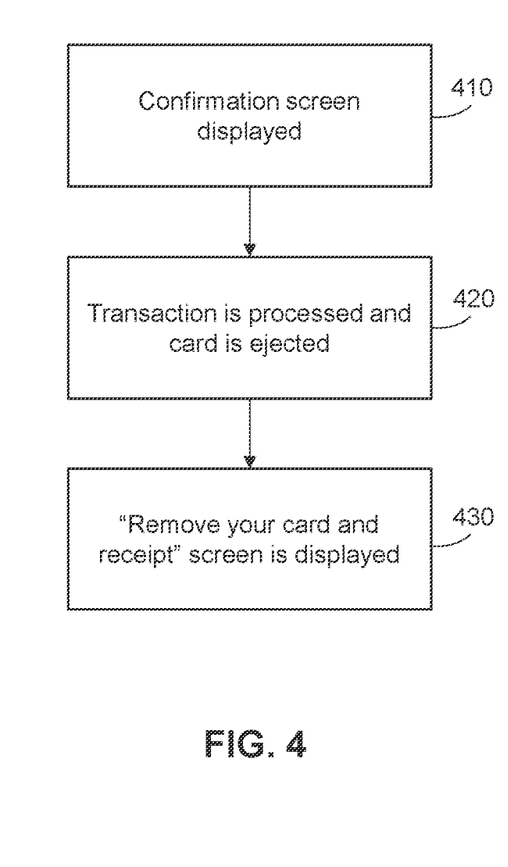
FIG. 4 shows a process for selectively returning a transaction card to a user of a transaction machine upon completion of a donation.
Figure 5:
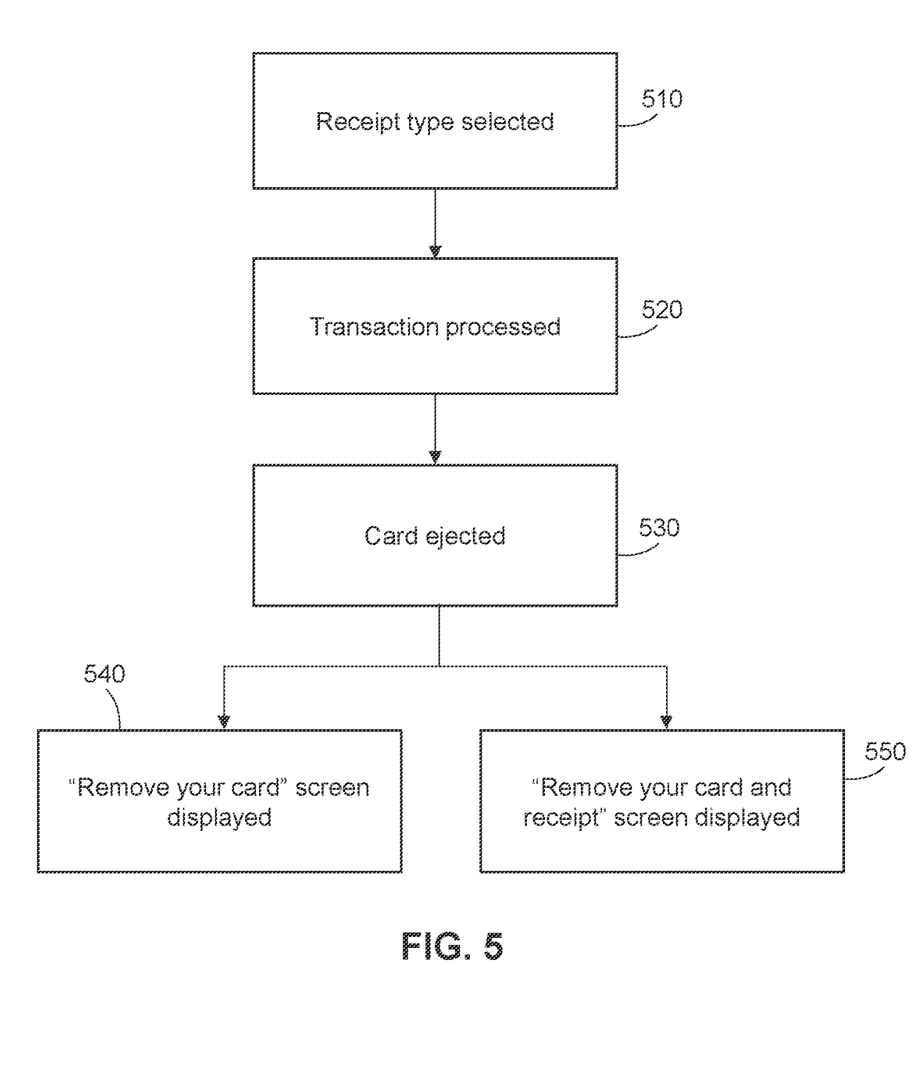
FIG. 5 shows a process for selectively returning a transaction card to a user of a transaction machine upon completion of a transfer or payment.
Figure 6:
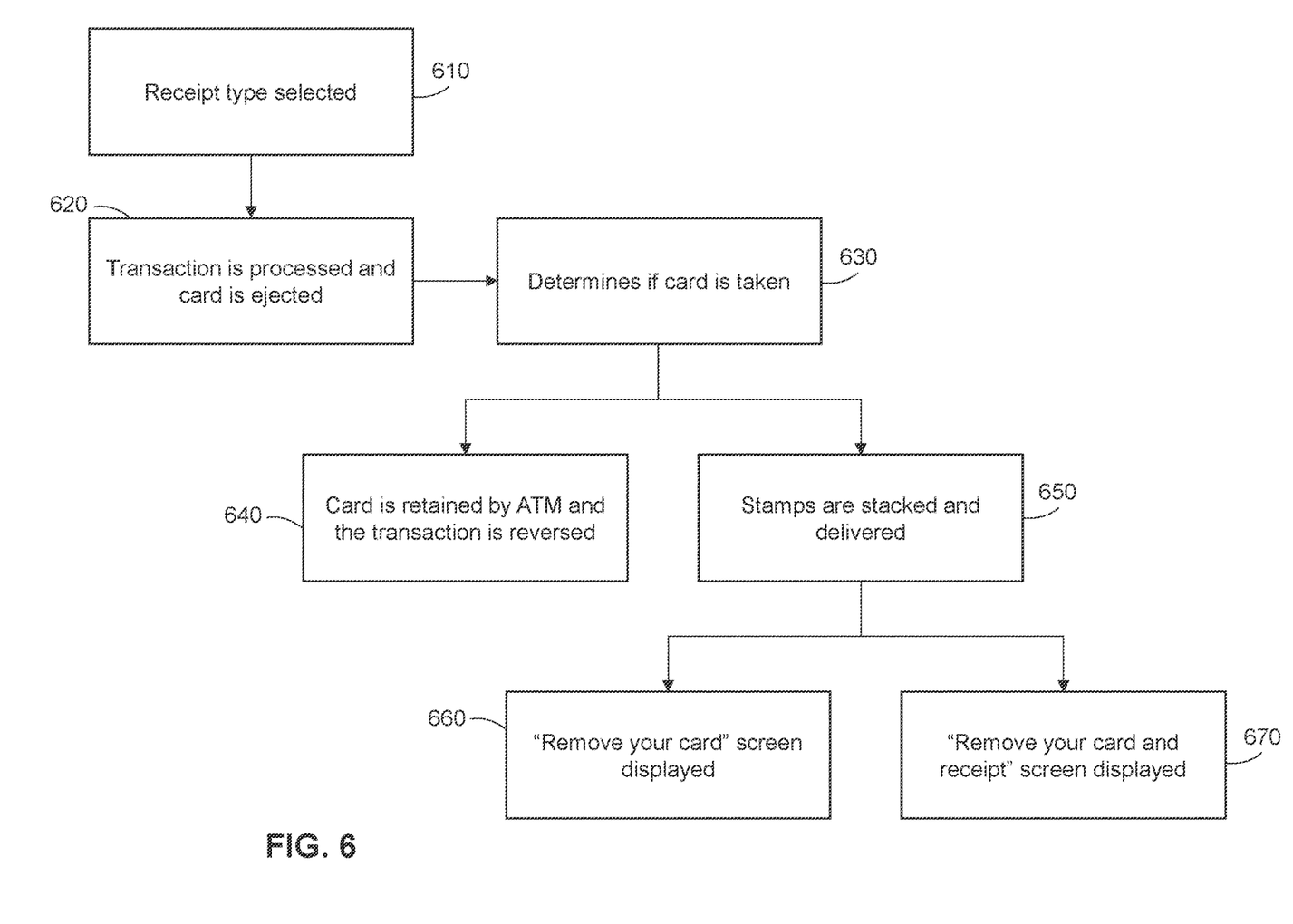
FIG. 6 shows a process for selectively returning a transaction card to a user of a transaction machine upon completion of purchasing stamps.
Figure 7:
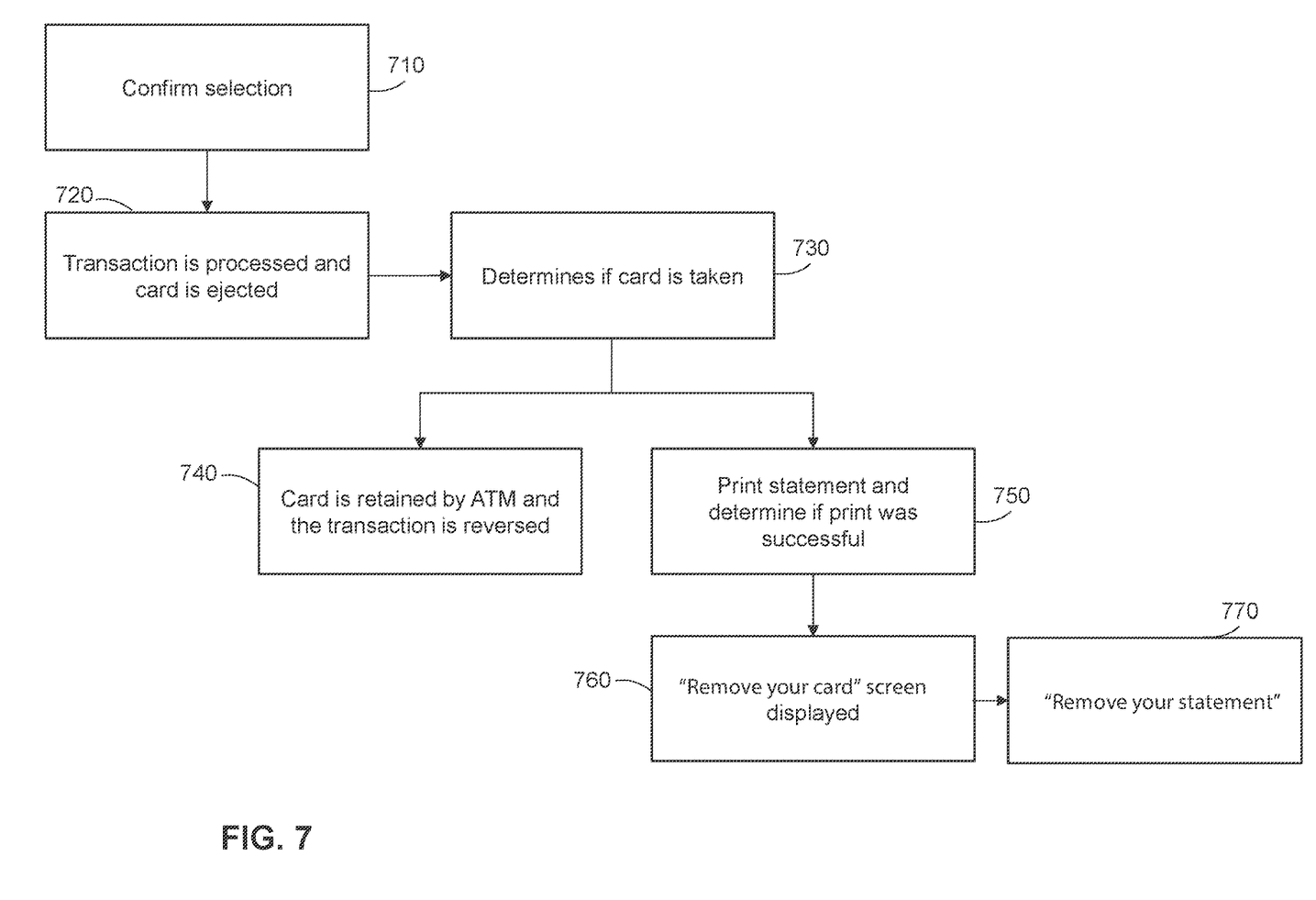
FIG. 7 shows a process for selectively returning a transaction card to a user of a transaction machine upon a user's selection of printing a statement, such as printing account balances or printing the user's last ten transactions.

Referring now to FIGS. 2-7, FIG. 2 shows an overall process for generating a customized sequence of user interfaces. FIG. 3 shows a process for selectively returning a transaction card to a user of a transaction machine upon completion of a deposit. FIG. 4 shows a process for selectively returning a transaction card to a user of a transaction machine upon completion of a donation. FIG. 5 shows a process for selectively returning a transaction card to a user of a transaction machine upon completion of a transfer or payment. FIG. 6 shows a process for selectively returning a transaction card to a user of a transaction machine upon completion of purchasing stamps. FIG. 7 shows a process for selectively returning a transaction card to a user of a transaction machine upon a user's selection of printing a statement, such as printing account balances or printing the user's last ten transactions.

FIG. 2 shows an overall process for generating a customized sequence of user interfaces. At step 210, identification information is received by a transaction machine 130 when an account holder 190 accesses the transaction machine 130 using a transaction card. At step 220, the user interface logic 107 accesses the activity profile information and determines if transaction chaining should be enabled for the user. At step 230, a display screen provides the user with transaction options. Next, at step 240, the user selects a transaction and the transaction is processed. If the user interface logic 107 determined that transaction chaining should be enabled in step 220, then at step 250, the display 138 provides the user with additional transaction options. If the user interface logic 107 determines that transaction chaining should not be enabled for the user, then the user's session is ended and the user's transaction card is ejected from the ATM at step 260.

As described above, providing some users with the ability to chain transactions is convenient if the users regularly complete multiple transactions during a single session. Chained transactions allow the user to complete multiple transactions without having to re-authenticate at the ATM (e.g., reinsert their transaction card, enter a PIN, etc.) and wait for their information to be authenticated for each transaction. For example, a user may be provided with a screen (sometimes referred to as a "chaining screen") that prompts the user to indicate whether the user wishes to perform another transaction. Upon receiving an affirmative indication from the user, the ATM provides the user with another set of options for transactions that may be performed without the user having to re-authenticate. In other examples of chained transactions, no chaining screen is provided and the user may be provided with another set of transaction options immediately after the preceding transaction is complete. For other users, for example those who regularly complete only one transaction during an ATM visit, chained transactions can be inconvenient because the user is required to manually end their session, and may result in transaction cards being left behind at the ATM when the user prematurely walks away after completing a single transaction, e.g., upon being presented with a chaining screen. By not offering chained transactions to users that regularly complete only one transaction per ATM session, card abandons may be reduced.

In some embodiments, a determination whether to offer to the user the option for chained transactions may be made based on activity profile information relating to the account holder's ATM or other transaction machine usage. For example, the user's activity profile information may compile a record of the user's previous sessions at an ATM and whether the user chained any transactions during those sessions. If a user has not chained transactions for a predetermined number of sessions (e.g., 10), then a determination may be made that the user generally does not chain transactions, and chained transactions may no longer be offered to that user. Different types of transactions may count as a chained transaction for purposes of assessing whether a user has performed chained transactions. For example, in some embodiments, any time the user presses the "Another Transaction" button can be counted as a chained transaction, regardless of whether the subsequent transaction is completed successfully. Some screens may not count as a chained transaction. For example, error screens, insufficient funds errors, and pop ups that offer to return the user to the main menu may not count as a chain even though the user attempted to complete a subsequent transaction. Chained transactions may be tracked on all types of transaction machines, including ATMs and point-of-sale devices where the user's card is not inserted and retained by the machine during the banking session (e.g., dip or swipe machines).

The number of preceding consecutive transactions without a chained transaction that is needed to trigger discontinuing offering chained transactions may itself also be determined based on the activity profile information. For example, if a user typically only chains transactions on average once every ten transactions, and the user typically always remembers to retrieve their card from the transaction machine, then the user may be provided with the ability to not chain transactions for fifteen or twenty transactions without having chaining disabled.

Other types of activity profile information may also be used to trigger discontinuing offering chained transactions to a user. For example, the trigger can include the user leaving their card behind in the transaction machine a predetermined number of times. In other words, a determination may be made that a particular user has a greater tendency than other users to leave their card behind in a transaction machine upon being presented with a chaining screen and, hence, chained transactions may no longer be offered to the user on that basis.

In some embodiments, the determination whether to offer chained transactions may be based on an assessment of the number of chained transactions over a period of time. For example, a user's transactions that occurred during a predetermined preceding time period (e.g., during the prior year) may be tracked and it may be determined that the user has performed nine transactions in the preceding year and none of those have been chained transactions. In that case, even though the user does not initiate a certain number of ATM sessions (e.g., 10) during the time period, chaining may still be disabled if the user has not chained transactions during the time period.

In some embodiments, the activity profile information upon which the determination whether to offer to the user the option for chained transactions is based may include information relating to the user's behavior in the context of specific types of transactions. For example, a particular user may typically perform chained transactions in some situations but not others. For example, if the first transaction is a deposit, the user may typically follow the deposit transaction with a withdrawal transaction. On the other hand, if the first transaction is a withdrawal transaction, the user may typically not perform any further transactions. Hence, such a user would be provided with the option to chain transactions if the first transaction is a deposit transaction, but may not be provided with the option to chain transactions if the first transaction is a withdrawal transaction.

In some embodiments, the activity profile information of the user may be taken in combination with other information to determine whether to offer to the user the option for chained transactions. For example, in some embodiments, the user may be assigned to a persona, and a decision may be made whether to offer the user the option for chained transactions based on a statistical analysis of prior activity of other users having the same persona. For example, the user may be a "sloppy payer" of their credit card bill, meaning that the user sometimes pays their credit card bills late even though the user has the money to pay their credit card bills on time. A probabilistic analysis of users fitting that persona may indicate that such users are more likely than others to abandon their transaction card at a transaction machine (e.g., because such users are more forgetful than typical users). On that basis, transaction chaining may be more quickly disabled for such a user (e.g., it may only take five consecutive unchained transactions to disable transaction chaining for such users).

In some embodiments, the activity profile information may be used to calculate a probability of the user abandoning their transaction card at a transaction machine, and the determination whether to offer chained transactions may be made on a transaction-by-transaction basis, i.e., in the context of a specific transaction at a transaction machine. For example, the calculated probability may be based not only on other information about the user (e.g., whether the user is a sloppy payer, in the previous example), but also on other information, such as information about the transaction (the type of transaction, the amount of money involved) and other factors (e.g., time of day, location of the transaction machine, and so on). If the probability of the user abandoning their transaction card in the context of that particular transaction is above a predetermined threshold, then the user may not be offered to perform a second (chained) transaction once the first transaction is complete.

In some embodiments, the activity profile information may be used to calculate a probability of the user performing a chained transaction at the transaction machine (i.e., if given the option to do so). Again, the calculated probability may be based on activity profile information of the user and/or other information (e.g., time of day, location of the transaction machine, and so on). If the probability of the user performing a chained transaction is below a predetermined threshold, then the user may not be offered the option to perform a second (chained) transaction once the first transaction is complete. Hence, if it is determined the user is unlikely to perform a chained transaction in a particular context, then the ATM may not offer the chaining option to the user. In some embodiments, the probability of the user performing a chained transaction may be taken in combination with the probability of the user abandoning their transaction card if another transaction is performed. Hence, if the user is likely to perform a chained transaction, but they are also likely to abandon their transaction card if they do perform a chained transaction, then the ATM may not offer the chaining option to the user.

In some embodiments, the determination whether to offer chained transactions may be made on a card-by-card basis, e.g., where a user has several different transaction cards. For example, a user may use both a credit card and a debit card at transaction machines, but may only perform chained transactions using one card and not the other.

In some embodiments, a user may be alerted that their activity profile information will be modified so that the user is no longer offered the ability to chain transactions before the modification takes place. For example, if the bank computer system is configured to stop offering users chained transactions after the user does not chain a transaction for ten consecutive sessions, alert generation logic 109 may send the user a mobile, SMS/text or email alert notifying the user of the impending change. The notification may also provide the user with a reply option or link to follow in order to continue receiving the option to chain transactions at transaction machines. The account holder may receive other alerts (e.g., mobile, email, at the transaction machine) allowing the account holder to opt in or opt out of chained transactions. In some cases, the account holder may not have an option of opting in or opting out of chained transactions. For example, the bank computer system 101 may determine that a particular account holder frequently abandons transaction cards and may restrict that user's ability to chain transactions or to turn the feature on or opt in.

In some embodiments, various mechanisms may be provided for re-enabling chained transactions after transaction chaining has been disabled. For example, once chaining has been disabled for a user, the user may be provided with the option to re-enable chaining through menu options on a transaction machine, banking website, through a teller at a bank location, or through a mobile banking application. For example, upon beginning a banking session at an ATM, a user whose chaining has been disabled may access an options screen and re-enable chaining. In some embodiments, even if the user has re-enabled chaining, chaining may be disabled once again if the user does not complete multiple transactions during a predetermined number of ATM sessions. A user that has chaining enabled may also have the option to turn chaining off. In some embodiments, an online banking website of the issuer of the transaction card may include an area (e.g., "ATM settings") where users can configure the menu options they are provided at ATM machines. For example, such an area may allow for the top level menu items, the sequencing of screens, etc., to be configured by the user. Such an area may also allow for the user to configure whether transaction is enabled or disabled.

In some embodiments, the determination whether to re-enable transaction chaining may be made based activity profile information of the user. For example, a user that typically has not performed chained transactions in the past may suddenly demonstrate a new pattern of performing a first transaction at an ATM, re-authenticating at the ATM after a card ejection, and performing a second transaction at the ATM after the re-authentication. Based on a recognition that the user has performed back-to-back transactions at the ATM, transaction chaining may subsequently be re-enabled automatically for the user, or the user may be prompted to re-enable transaction chaining during the next transaction.

FIG. 3 shows a process for selectively returning a transaction card to a user of a transaction machine upon completion of a deposit. At step 310, a user has completed a deposit of currency (e.g., a check, cash, or both), and is shown a display screen prompt to select a receipt. The user may have several receipt options to choose from. For example, the user may be prompted to email the receipt, send the receipt, text the receipt, print the receipt with a summary, print the receipt with images, or receive no receipt. At step 320, after selecting a receipt option, the transaction is processed. Next, during step 330, the user's transaction card is ejected and the deposit is sent to the ATM's vault. If no receipt was selected or if the user chose to receive a text or email receipt in step 310, the "Remove your card" screen is displayed, as shown in step 340, thus ending the session. If a printed receipt was selected in step 310, the "Remove your card and receipt" screen is displayed, as shown in step 350, thus ending the session. In the case of a user who has chaining enabled, the user's transaction card will not be ejected in step 330 and more transaction options may be displayed.

FIG. 4 shows a process for selectively returning a transaction card to a user of a transaction machine upon completion of a donation. At step 410, a confirmation screen displays an amount of money to donate and the organization that will receive the donation. For example, when a user selects to donate $500 to the American Red Cross, a confirmation screen is displayed that indicates $500 will be donated to the American Red Cross and, if the user has multiple accounts, from which account the donation will be drawn. At step 420, after the user confirms the donation in step 410, the donation transaction is processed and the user's transaction card is ejected. At step 430, a receipt is printed and a screen is displayed that prompts the user to remove their card and receipt, thus ending the session. In the case of a user who has chaining enabled, the user's transaction card may not be ejected in step 420 and more transaction options may be displayed.

FIG. 5 shows a process for selectively returning a transaction card to a user of a transaction machine upon completion of a transfer or payment. At step 510, a user has completed a transfer of funds or made a payment, and is shown a display screen prompt to select a receipt. The user may have several receipt options to choose from. For example, the user may be prompted to email the receipt, send the receipt, text the receipt, print the receipt with a summary, print the receipt with images, or receive no receipt. At step 520, after selecting a receipt option, the transaction is processed. Next, during step 530, the user's transaction card is ejected. If no receipt was selected or if the user chose to receive a text or email receipt in step 510, the "Remove your card" screen is displayed, as shown in step 540, thus ending the session. If a printed receipt was selected in step 510, the "Remove your card and receipt" screen is displayed, as shown in step 550, thus ending the session. In the case of a user who has chaining enabled, the user's transaction card will not be ejected in step 530 and more transaction options may be displayed.

FIG. 6 shows a process for selectively returning a transaction card to a user of a transaction machine upon completion of purchasing stamps. At step 610, a user has chosen stamps to purchase and is shown a display screen prompt to select a receipt. The user may have several receipt options to choose from. For example, the user may be prompted to email the receipt, send the receipt, text the receipt, print the receipt with a summary, print the receipt with images, or receive no receipt. At step 620, after selecting a receipt option, the transaction is processed and the user's transaction card is ejected. Next, at step 630, the transaction machine determines if the user has taken their transaction card. For example, the transaction machine may provide the user with a predetermined time limit to take their card. If the user's card is not taken, the transaction machine may display a screen prompting the user to determine if they need more time. At step 640, once a sufficient time has passed without the user taking their transaction card, the transaction machine retains the transaction card and reverses the user's purchase of stamps, thus ending the session. At step 650, if the transaction machine determines that the user has taken their transaction card during step 630, the transaction machine prepares the number of stamps purchased and delivers the stamps to the user. In some cases, the transaction machine may unsuccessfully prepare stamps and may not be able to deliver them, in which case the transaction is reversed, thus ending the session. If stamps are delivered successfully, and the user elected to receive no receipt or to receive a text or email receipt in step 610, the "Remove your card" screen is displayed, as shown in step 660, thus ending the session. If a printed receipt was selected in step 610, the "Remove your card and receipt" screen is displayed, as shown in step 670, thus ending the session. In the case of a user who has chaining enabled, the user's transaction card will not be ejected in step 620 and more transaction options may be displayed.

FIG. 7 shows a process for selectively returning a transaction card to a user of a transaction machine upon a user's selection of printing a statement, such as printing account balances or printing the user's last ten transactions. At step 710, a user has chosen to print a log of account balances or of their last ten transactions and is prompted to confirm the action. At step 720, the transaction is processed and the user's transaction card is ejected. Next, at step 730, the transaction machine determines if the user has taken their transaction card. For example, the transaction machine may provide the user with a predetermined time limit to take their card. If the user's card is not taken, the transaction machine may display a screen prompting the user if they need more time. At step 740, once a sufficient time has passed without the user taking their transaction card, the transaction machine retains the transaction card and ends the session. In some embodiments, the transaction machine also cancels the transaction so that the customer's account information is not made available to the next user of the transaction machine. At step 750, if the transaction machine determines that the user has taken their transaction card during step 730, the transaction machine prints the user's selected statement and determines if the print was successful. In some cases, the transaction machine may unsuccessfully print the statement (e.g., due to a hardware error or other error), in which case the transaction is canceled and the session is ended. If the statement is printed successfully, the "Remove your card"

screen is displayed, as shown in step 760, and is immediately followed by the "Remove your statement" screen, as shown in step 770, thus ending the session. In the case of a user who has chaining enabled, the user's transaction card will not be ejected in step 720 and more transaction options may be displayed.

The embodiments of the methods and system have been described with reference to drawings. The drawings illustrate certain details of specific embodiments that implement the systems and methods and programs of the present invention. However, describing the invention with drawings should not be construed as imposing on the invention any limitations that may be present in the drawings. The embodiments described above contemplate methods, systems and program products stored on any non-transitory machine-readable storage media for accomplishing its operations. The embodiments may be implemented using an existing computer processor, or by a special purpose computer processor incorporated for this or another purpose or by a hardwired system.

As noted above, embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, logics, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method comprising:
determining, by a computing system, an activity profile based on usage information of an account holder at one or more transaction machines, wherein the one or more transaction machines are at least one of an automated teller machine (ATM) or a point-of-sale (POS) device;
assigning, by the computing system, a persona to the account holder based on the activity profile;
determining, by the computing system, to offer an option for chaining transactions to the account holder based on analyzing prior activity of other account holders having a same persona as the persona of the account holder;
receiving, by the computing system from a transaction machine, identification information of the account holder; and
causing, by the computing system, the transaction machine to offer a chained transaction option to the account holder by generating and displaying one or more user interfaces on the transaction machine enabling a chained transaction.

2. The method of claim 1, wherein the identification information is received from a device of the account holder.

3. The method of claim 2, wherein the device is one of a credit card, a debit card, a stored value card, or a mobile computing device.

4. The method of claim 1, wherein enabling the account holder to chain the transactions enables the account holder to make multiple transactions while using the transaction machine without re-authenticating the account holder for each transaction.

5. The method of claim 1, wherein the activity profile comprises sequencing information based on the account holder attempting multiple transactions during a previous transaction machine session.

6. The method of claim 1, further comprising:
determining, by the computing system, a change in the activity profile based on additional usage information of the account holder at the one or more transaction machines; and
transmitting, by the computing system, a notification to the account holder based on determining to disable chaining the transactions.

7. The method of claim 6, wherein the notification comprises a reply option, wherein the reply option enables the account holder to re-enable chaining the transactions.

8. The method of claim 6, wherein the change in the activity profile comprises a change in a number of transaction cards abandoned by the account holder.

9. The method of claim 1, wherein the one or more user interfaces comprise a custom sequence of user interfaces based on an analysis of prior transaction machine activity of another user.

10. A computing system comprising:
one or more processors; and
one or more memory devices storing instructions therein that, when executed by the one or more processors, cause the one or more processors to perform operations comprising:
determining an activity profile based on usage information of an account holder at one or more transaction machines, wherein the one or more transaction machines are at least one of an automated teller machine (ATM) or a point-of-sale (POS) device;
determining to offer an option for chaining transactions to the account holder based on the activity profile;
receiving, from a transaction machine, identification information of the account holder; and
causing the transaction machine to offer a chained transaction option to the account holder by generating and displaying one or more user interfaces on the transaction machine enabling a chained transaction.

11. The computing system of claim 10, wherein the identification information is received from a device of the account holder.

12. The computing system of claim 11, wherein the device is one of a credit card, a debit card, a stored value card, or a mobile computing device.

13. The computing system of claim 10, wherein the activity profile includes information relating to the account holder attempting multiple transactions during a previous transaction machine session.

14. The computing system of claim 10, wherein a sequence of the one or more user interfaces is based on an initial transaction type made during a transaction machine session.

15. The computing system of claim 14, wherein the operations further comprise generating an option for the account holder to change a setting relating to the activity profile, wherein the setting enables the account holder to make multiple transactions during the transaction machine session.

16. The computing system of claim 10, wherein the operations further comprise transmitting a notification to the account holder based on a change occurring to the activity profile.

17. The computing system of claim 16, wherein the notification comprises a reply option, wherein the reply option enables the account holder to enable chaining the transactions.

18. The computing system of claim 16, wherein the change in the activity profile comprises a change in a number of transaction cards abandoned by the account holder.

19. A method comprising:
receiving, by a computing system from a transaction machine, identification information, the identification information associated with a user using the transaction machine;
determining, by the computing system, to offer an option for chaining transactions to the user based on an activity profile of the user;
causing, by the computing system, the transaction machine to offer a chained transaction option to the user by generating and displaying one or more user interfaces on the transaction machine enabling a chained transaction; and ending a transaction machine session after a predetermined number of transactions, wherein the predetermined number of transactions is based on the activity profile.

20. The method of claim 19, wherein the identification information is received from a device of the user, and wherein the activity profile is based on usage information of the user at one or more transaction machines or another user at the one or more transaction machines, wherein the one or more transaction machines are at least one of an automated teller machine (ATM) or a point-of-sale (POS) device.

* * * * *